United States Patent
De Vaulx et al.

(10) Patent No.: US 12,366,197 B2
(45) Date of Patent: Jul. 22, 2025

(54) COOLING LOOP, IN PARTICULAR FOR A MOTOR VEHICLE, AND SENSOR FITTED ON BOARD THE LOOP

(71) Applicant: VALEO SYSTEMES THERMIQUES, La Verriere (FR)

(72) Inventors: Cedric De Vaulx, La Verriere (FR); Kamel Azzouz, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 0 days.

(21) Appl. No.: 18/546,628

(22) PCT Filed: Feb. 7, 2022

(86) PCT No.: PCT/EP2022/052899
§ 371 (c)(1),
(2) Date: Aug. 16, 2023

(87) PCT Pub. No.: WO2022/175129
PCT Pub. Date: Aug. 25, 2022

(65) Prior Publication Data
US 2024/0125266 A1    Apr. 18, 2024

(30) Foreign Application Priority Data
Feb. 16, 2021    (FR) ........................... 2101491

(51) Int. Cl.
*F01P 11/18*    (2006.01)
*F01P 3/20*    (2006.01)

(52) U.S. Cl.
CPC ................ *F01P 11/18* (2013.01); *F01P 3/20* (2013.01); *F01P 2025/80* (2013.01)

(58) Field of Classification Search
CPC .......... F01P 11/18; F01P 3/20; F01P 2025/80; F01P 2060/02; F01P 2060/14; F01P 11/14; B60K 11/02
See application file for complete search history.

(56) References Cited

U.S. PATENT DOCUMENTS 7,581,434 B1 * 9/2009 Discenzo ........... G01N 33/2888
 73/53.01
9,752,971 B2   9/2017 Tomita et al.
(Continued)

FOREIGN PATENT DOCUMENTS

DE         3719430 A1    12/1988
DE    102005043699 A1     3/2007
(Continued)

OTHER PUBLICATIONS

Machine Translation of DE102016121997A1 PDF File Name: "DE102016121997A1_Machine_Translation.pdf".*
(Continued)

*Primary Examiner* — Grant Moubry
*Assistant Examiner* — Ruben Picon-Feliciano
(74) *Attorney, Agent, or Firm* — Valeo Systemes Thermiques (57) ABSTRACT

The present invention relates to a cooling loop, in particular for a motor vehicle, the loop being configured to allow a heat exchange between a cooling liquid and a liquid to be cooled. According to the invention, the cooling loop includes an on-board sensor which is positioned at least partially in contact with the cooling liquid, the sensor being configured to supply at least one datum relating to at least one physical property and/or chemical property of the cooling liquid.

2 Claims, 14 Drawing Sheets

(56) References Cited

U.S. PATENT DOCUMENTS 10,466,152 B2   11/2019  Gillette, II et al.
2007/0231911 A1*  10/2007  DeNatale ............ G01N 33/2888
                                                          436/60

FOREIGN PATENT DOCUMENTS

| DE | 102016121997 A1 * | 5/2018 | .............. F01P 11/06 |
| DE | 102026121997 A1 | 5/2018 | |
| EP | 2863031 A1 | 4/2015 | |
| EP | 3293380 A1 | 3/2018 | |
| WO | 2011133164 A1 | 10/2011 | |
| WO | 2017097769 A1 | 6/2017 | |

OTHER PUBLICATIONS

European Patent Office, International Search Report (with English translation) and Written Opinion of corresponding International Application No. PCT/EP2022/052899, dated Jun. 1, 2022.
European Patent Office, Office Action of corresponding European Application No. EP22704527.5, dated Mar. 7, 2025, 7 pages.

* cited by examiner

COOLING LOOP, IN PARTICULAR FOR A MOTOR VEHICLE, AND SENSOR FITTED ON BOARD THE LOOP

TECHNICAL FIELD

The invention pertains to a cooling loop, in particular for a motor vehicle, and to a sensor embedded on said loop.

BACKGROUND OF THE INVENTION

A cooling loop uses a cooling liquid which exchanges heat with a fluid to be cooled. The cooling liquid is generally formed of a mixture comprising a solvent, a solute, and anti-corrosion additives in well-defined nominal proportions. However, these proportions can vary over time, leading to a loss of antifreeze properties and overheating of the cooling liquid, or widespread corrosion of the cooling loop. Furthermore, the mixture forming the cooling liquid can be the site of dissolution of metal species or the site of oxidation and/or formation of subspecies. These phenomena have serious consequences for the cooling loop, and even for the vehicle as a whole.

To overcome this, it is known to take appropriate corrective actions. These corrective actions involve, as the case can be, adding anti-corrosion additives or draining the cooling loop on a regular basis, but without prior checking.

More rarely, it has been proposed for the quality of the cooling liquid to be checked ex situ by taking a sample of said cooling liquid from the cooling loop of the vehicle. The disadvantage of this type of check is that it can only be carried out when the vehicle is stationary, in a garage or dealership, which effectively rules out the possibility of detecting any deterioration in the cooling liquid between two inspection visits.

This limitation of the current system for checking the cooling liquid calls for the development of a monitoring solution that is operational without any major constraints for the user, and in particular without the need to go to a specialist or to take a sample.

SUMMARY OF THE INVENTION

The invention aims to at least partially alleviate the above problems and to this end proposes, according to a first aspect, a cooling loop, in particular for a motor vehicle, said loop being configured to allow a heat exchange between a cooling liquid and a liquid to be cooled. According to the invention, the cooling loop comprises an embedded sensor which is positioned at least partially in contact with the cooling liquid, said sensor being configured to provide at least one datum relating to at least one physical and/or chemical property of said cooling liquid.

With a sensor embedded in the cooling loop, the invention thus makes it easier to check the cooling liquid by eliminating the need for the user to immobilize the vehicle and take test samples ex situ.

The invention can also comprise any one of the following features, taken individually or in any technically possible combinations forming as many embodiments of the invention:
- the cooling loop comprises a microprocessor;
- the microprocessor is configured to use said datum or data;
- the physical and/or chemical property provided by the sensor is selected from the refractive index, density, electrical conductivity, hydrogen potential, and/or viscosity of the cooling liquid and/or the sound velocity through said liquid;
- said cooling loop is configured to provide a measurement of a solute concentration of the cooling liquid from said datum or data;
- said measurement is obtained by taking account of a datum relating to the electrical conductivity and a datum relating to the viscosity of the cooling liquid;
- the cooling loop comprises a heat exchanger selected from a radiator, a condenser, a charge air cooler, a recirculated exhaust gas cooler or a battery cooler;
- the sensor is positioned in a cooling liquid circuit of said exchanger;
- the cooling loop comprises one or more cooling liquid circulation lines;
- the sensor is positioned on the line or on one of said lines;
- the cooling loop comprises at least one component selected from an expansion vessel, a pump for circulating the cooling liquid, a valve for controlling the circulation of the cooling liquid, a connection flange and/or a cooling circuit for a cylinder head and/or for an engine block;
- the sensor is located at said component or components.

According to a second aspect, the invention pertains to a heat exchanger for a cooling loop with the features described above. Advantageously, the heat exchanger comprises any one of the following features, taken individually or in any technically possible combinations forming as many embodiments of the invention:
- the heat exchanger comprises a header tank for circulating the cooling liquid;
- said header tank comprises said sensor;
- the header tank comprises an opening configured to selectively receive the sensor or a closure cap;
- the heat exchanger comprises a removable flange configured to be connected to the header tank and to allow a connection of a tube for the passage of the cooling liquid between said tube and the header tank through said flange;
- the sensor is positioned on the flange According to a third aspect, the invention pertains to a sensor for a cooling loop with the features listed above. In particular, the sensor comprises a probe configured to be brought into contact at least partially with the cooling liquid, said liquid being in flow or at rest According to a fourth aspect, the invention pertains to a component for a motor vehicle, said component comprising a sensor as previously defined. Advantageously, said component is selected from a heat exchanger, a pump for circulating a cooling liquid, a valve for controlling the circulation of a cooling liquid, a connection flange, a cylinder head of an engine and/or an engine block.

According to a fifth aspect, the invention pertains to a method for checking a cooling liquid of a cooling loop as described above, said method comprising a step of measuring a physical and/or chemical property datum of said liquid using said sensor. Preferably, said measurement takes place between two journeys made by a motor vehicle.

BRIEF DESCRIPTION OF DRAWINGS

The invention will be better understood and further details, features and advantages of the invention will become apparent from reading the following description given by way of non-limiting example and with reference to the appended drawings, in which.

DETAILED DESCRIPTION OF THE INVENTION

With reference to FIGS. 1a, 1b, 1c and 1d, the invention pertains to a cooling loop 100, 200, 300, 400, in particular for a motor vehicle. Said loop is configured to allow a heat exchange between a cooling liquid and one or more fluids to be cooled.

In particular, the cooling liquid is formed of a mixture comprising a solvent, e.g. water; a solute, e.g. ethylene glycol or methanol; and/or anti-corrosion additives. These various constituents are present in the cooling liquid in nominal mass fractions that ensure the performance of said cooling liquid.

For a cooling liquid comprising a water/ethylene glycol mixture or a water/methanol mixture, the solute nominal mass fraction is of the order of 40 to 50%. A variation in this mass fraction over time leads to a loss of antifreeze properties and overheating of the cooling liquid, and also widespread corrosion of the cooling loop.

To prevent these faults, the invention proposes checking the quality of the cooling liquid. Corrective actions can then be taken if necessary, depending on the nature of the damage revealed by checking operation. The quality of the cooling liquid is checked by monitoring the evolution of a certain number of physical and/or chemical properties of said liquid, which are advantageously representative of variation in the mass fractions of the constituents of said liquid. In this way, said variation can be checked.

According to the invention, the cooling loop comprises at least one embedded sensor 10 which is positioned at least partially in contact with the cooling liquid.

In particular, the sensor 10 is configured to provide at least one datum relating to at least one physical and/or chemical property of said cooling liquid. In addition, the sensor 10 comprises a probe 11 configured to be bathed by the cooling liquid in flow and/or at rest. Said probe 11 advantageously has reduced dimensions and can be of the flow-through or lab-on-chip type. It should be noted that lab-on-chip probes are more compact and more accurate than flow-through probes.

The physical and/or chemical properties targeted by the sensor 10 include the refractive index, density, electrical conductivity, hydrogen potential and/or viscosity of the cooling liquid and/or the sound, in particular ultrasound, propagation velocity through said liquid.

In particular, the measurement of the hydrogen potential of the cooling liquid provides information on the overall quality of said liquid and gives an indication of the concentration of anti-corrosion additives. Thus, a hydrogen potential of between 9 and 10 indicates a good quality of the cooling liquid. On the other hand, a hydrogen potential of less than 8 indicates that a significant fraction of the corrosion inhibitors has been consumed and it is necessary to add more to the cooling liquid. Furthermore, if the hydrogen potential falls below 7, this indicates severe oxidation of the cooling liquid. In this case, it is recommended to replace it, after first draining and flushing the cooling loop.

With regard to the refractive index, electrical conductivity, viscosity, density, and sound velocity, their measurement in relation to the cooling liquid makes it possible to determine the solute mass concentration of said cooling liquid.

Figure 2:
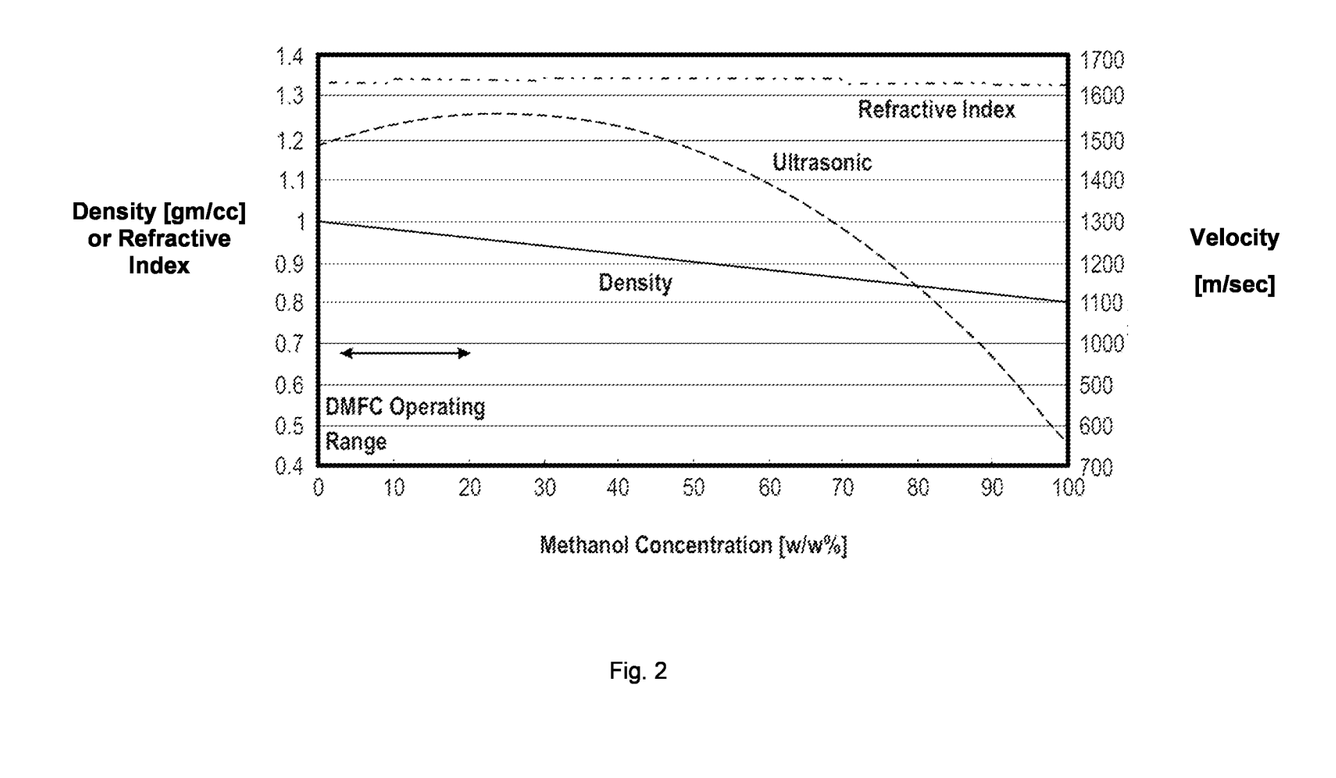
FIG. 2 shows curves showing the evolution of refractive index, sound velocity, and density as a function of the solute mass concentration in a water/methanol mixture.

FIG. 2 shows the evolution of refractive index, sound velocity, and density as a function of the solute mass concentration for a cooling liquid comprising a mixture of water as solvent and methanol as solute. Here, refractive index and density follow a linear evolution with respect to the solute mass fraction, an evolution that is not very distinct for the refractive index. Furthermore, sound velocity exhibits a distinct evolution as a function of the solute mass concentration, with a maximum around a solute mass fraction of approximately 30%. In the vicinity of this maximum, there are two solute mass concentration values for the same sound velocity value.

In order to distinguish between these two values of solute mass concentration, it is necessary to use a curve showing the evolution of another physical and/or chemical property as a function of the solute mass fraction.

Figure 3:
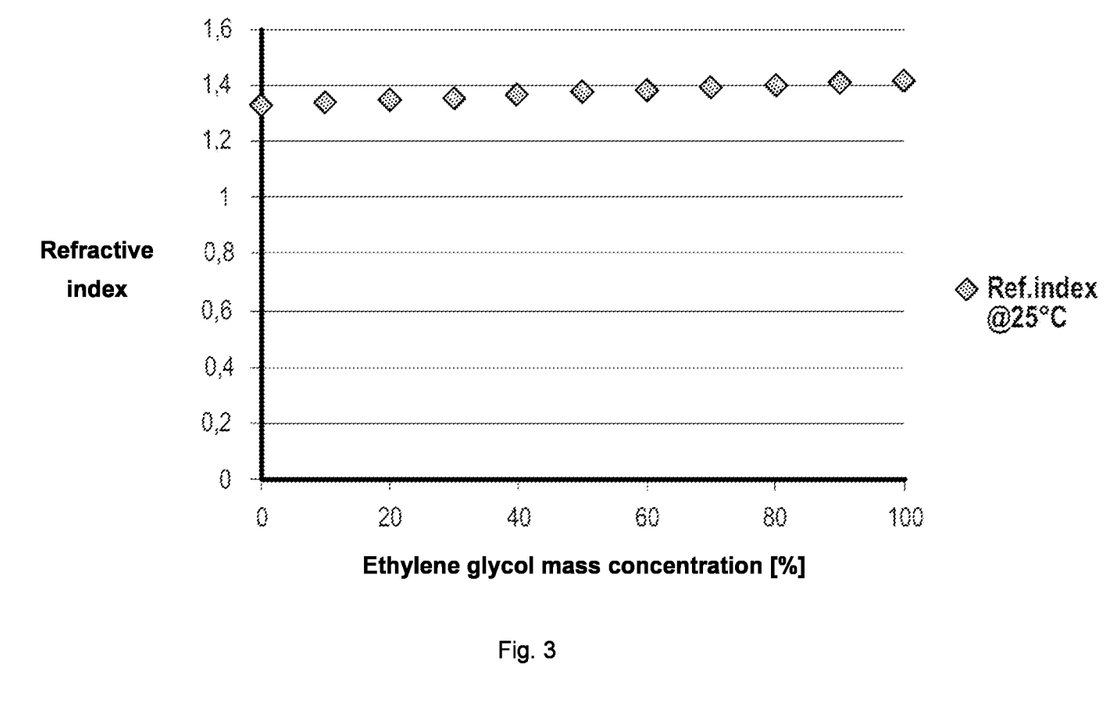
FIG. 3 shows the evolution of refractive index as a function of the solute mass concentration in a water/ethylene glycol mixture.
Figure 4:
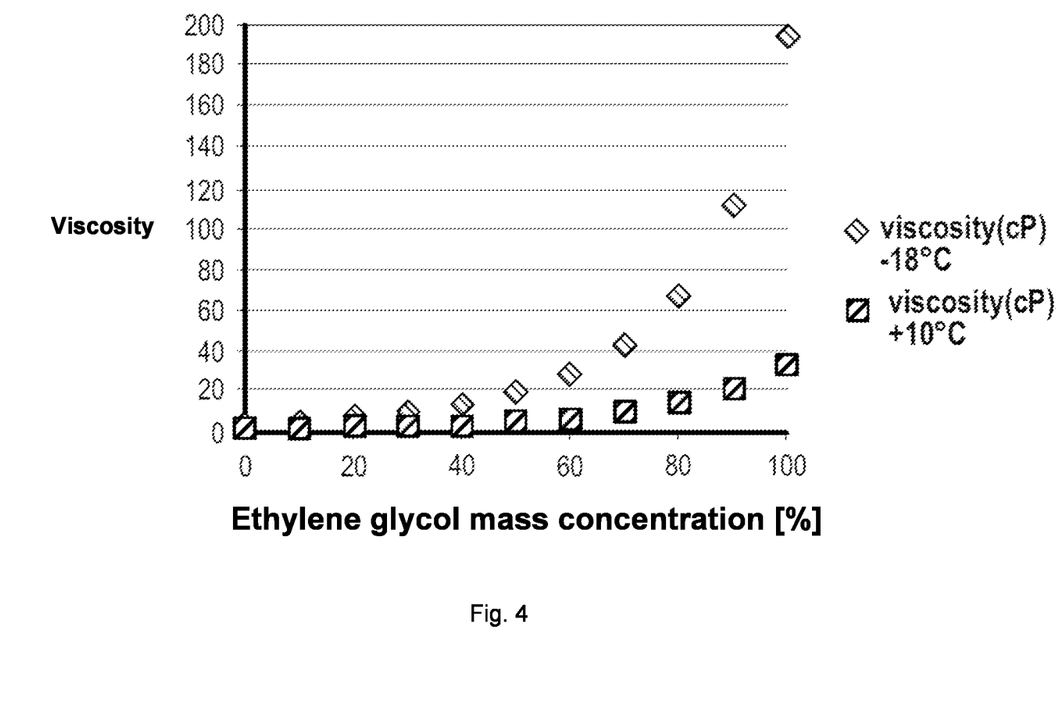
FIG. 4 shows the evolution of viscosity as a function of the solute mass concentration in a water/ethylene glycol mixture.
Figure 5:
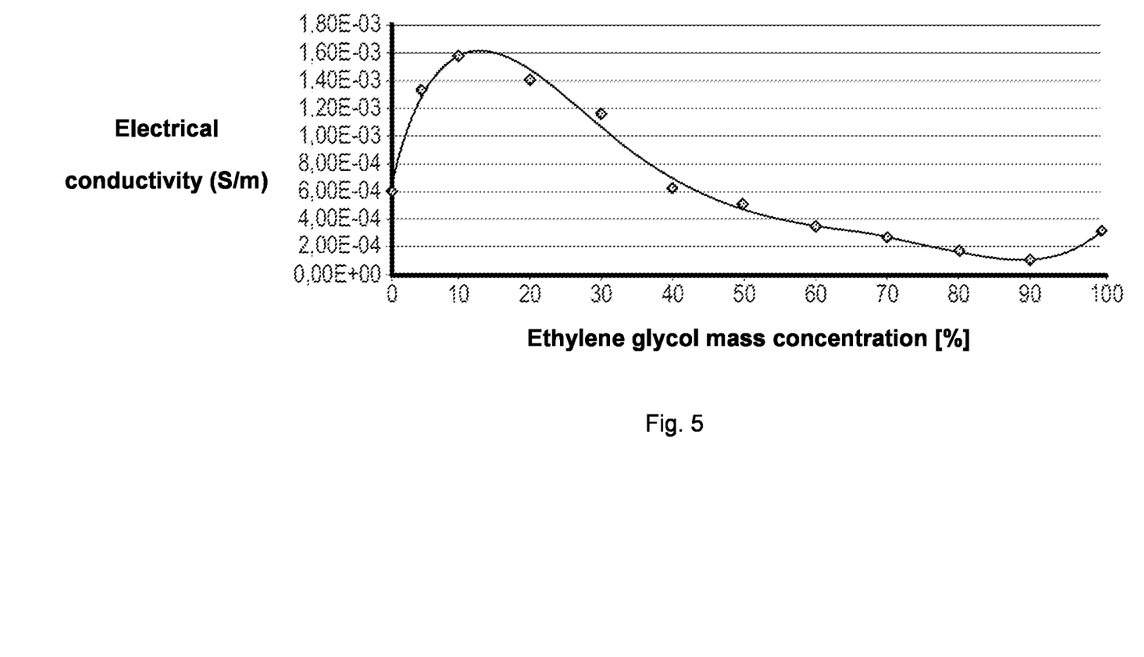
FIG. 5 shows the evolution of electrical conductivity as a function of the solute mass concentration in a water/ethylene glycol mixture.

FIGS. 3, 4 and 5 respectively show the evolution of refractive index, viscosity, and electrical conductivity in relation to the solute mass fraction for a cooling liquid comprising a mixture of water as solvent and ethylene glycol as solute.

With reference to FIG. 3, the evolution of refractive index as a function of the solute mass concentration is linear and remains very limited over the entire range of variation in the mass concentration.

With reference to FIG. 4, the evolution of viscosity as a function of the solute mass concentration follows a power law, with a slight increase over a lower range of solute mass concentrations, and a significant increase over a higher range of solute mass concentrations. It should be noted that the lower the temperature of the mixture, the greater the increase in viscosity over the upper range of solute mass concentrations.

Refractive index and viscosity, which change very little over certain ranges of variation in the solute mass concentration, require a very high level of accuracy on the sensor probe if they are to be used in the context of the invention as physical and/or chemical properties of interest.

On the other hand, such a level of accuracy is not required for a sensor targeting electrical conductivity as physical property of interest. Indeed, as illustrated in FIG. 5, the evolution of electrical conductivity as a function of the solute mass concentration is distinct over the entire range of variation in said mass concentration. However, there is a first peak around a solute mass fraction of approximately 15% and a second peak around a solute mass fraction of approximately 90%. In the vicinity of each of these peaks, two values of solute mass concentration coexist for the same value of electrical conductivity.

In order to distinguish between these two values of solute mass concentration, it is necessary to use a curve showing the evolution of another physical and/or chemical property as a function of the solute mass fraction.

Advantageously, according to the invention, the value of the solute mass fraction is determined by taking account of the curves showing the evolution of electrical conductivity and viscosity as a function of the solute mass fraction. The combined use of these two quantities gives a reliable mass fraction result over a wide range of values.

It should be noted that the electrical conductivity of the cooling liquid is preferably measured using a sensor equipped with a flow-through probe. The density and refractive index of the cooling liquid, and also the velocity at which ultrasound propagates through said cooling liquid, are preferably measured using a sensor equipped with a lab-on-chip probe.

A microprocessor interacting with the sensor calculates a value for the solute mass fraction of the cooling liquid on the basis of a physical and/or chemical property datum of said liquid. In particular, the microprocessor proceeds by inversion of a system of linear equations correlating the physical and/or chemical property or properties of the cooling liquid, provided by the sensor or sensors, with the solute mass fraction of said cooling liquid.

Advantageously, the microprocessor is embedded in the cooling loop and connected to the sensor by means of a connection cable or by any data transmission means.

Figure 1A:
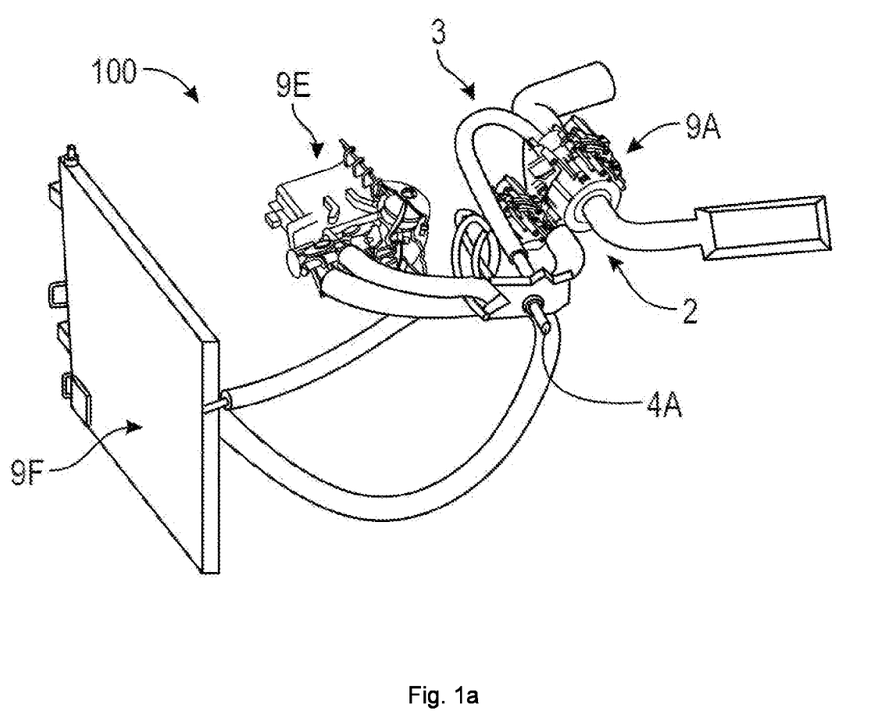
FIG. 1a shows an example of a cooling loop according to the invention.

With reference again to FIGS. 1a, 1b, 1c and 1d, the cooling loop 100, 200, 300, 400 comprises at least one heat exchanger 9 in which heat energy is transferred between the cooling liquid and the fluid to be cooled. Said exchanger 9 is selected from a cooling radiator 9F (FIGS. 1a to 1d), a recirculated exhaust gas cooler 9A (FIGS. 1a, 1c), a heating radiator 9B (FIG. 1b), a water condenser 9C (FIG. 1c), a battery cooler 9D (FIG. 1d) or a water charge air cooler 9E (FIGS. 1a and 1c). Furthermore, the cooling loop 100, 200, 300, 400 can comprise at least one component 4 and at least one fluidic connection line.

In a cooling loop 100, 200, 300, 400 as described above, the sensor 10 according to the invention can be positioned either on any of the heat exchangers 9, or on the or one of the components 4, or on the or one of the lines. In particular, in a position embedded on one of the heat exchangers, the sensor 10 is preferably located downstream 3 of said exchanger. However, a position upstream 2 of said exchanger remains possible. Said loop 100, 200, 300, 400 can also be equipped with sensors positioned at several points on said loop.

More specifically, FIG. 1a shows a cooling loop 100 comprising a cooling radiator 9F, a recirculated gas cooler 9A and a charge air cooler 9E. Said loop 100 also comprises a valve 4A for controlling a circulation of the cooling liquid between the exchangers 9A, 9E, 9F. In this cooling loop 100, the sensor 10 is preferably mounted at the inlet 2 or outlet 3 of the recirculated gas cooler 9A. However, the sensor 10 can be mounted on the cooling radiator 9F or on the charge air cooler 9E. Moreover, the sensor 10 can be mounted on the control valve 4A, on the line or lines connecting the exchangers 9A, 9E, 9F together, or on the line or lines connecting said exchangers to the control valve 4A.

Figure 1B:
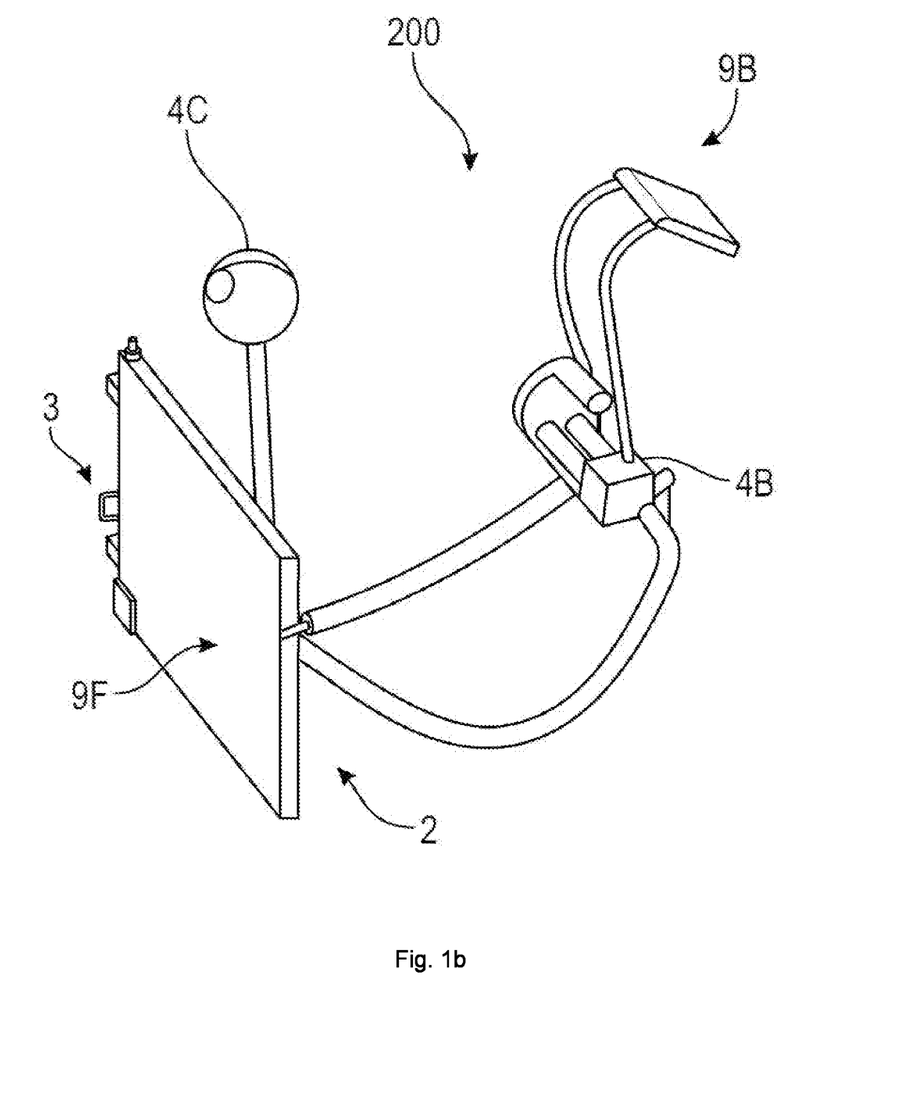
FIG. 1b shows a second example of a cooling loop according to the invention.
Figure 1C:
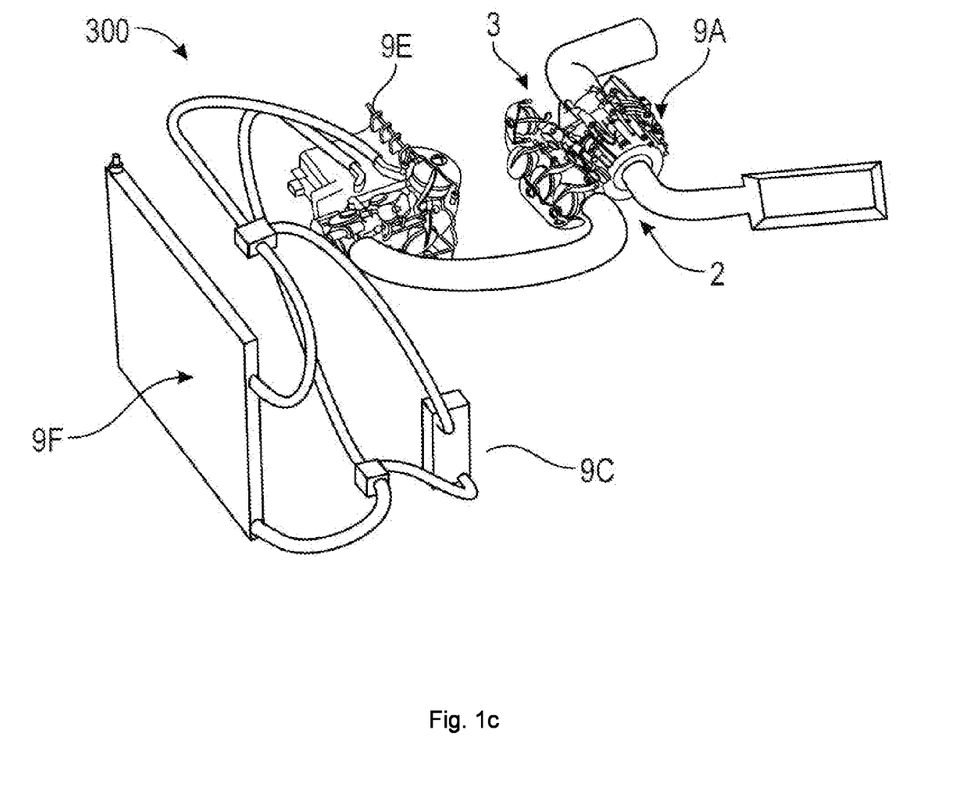
FIG. 1c shows a third example of a cooling loop according to the invention.

FIG. 1b shows a cooling loop 200 comprising a cooling radiator 9F and a heating radiator 9B, each of which communicates with an engine cylinder head and/or an engine block (not shown) by means of lines located upstream 5 and downstream 1. The cooling loop 200 also comprises a cooling liquid drive pump 4B and an expansion vessel 4C, said drive pump being positioned between the heating radiator 9B and the cooling radiator 9F. As in the previous loop example, the sensor 10 can be positioned in any of the components 4A, 4C and/or any of the radiators 9F, 9B forming the cooling loop 200. Here, the sensor 10 is preferably mounted at the outlet 3 of the cooling radiator 9F.

FIG. 1c shows a cooling loop 300 comprising a cooling radiator 9F, a water charge cooler 9E, a recirculated gas cooler 9A and a water condenser 9C. Each of said exchangers 9A, 9C, 9E, 9F can be equipped with a sensor 10. Here, the sensor 10 is preferably mounted at the inlet 2 or outlet 3 of the recirculated gas cooler 9A.

Figure 1D:
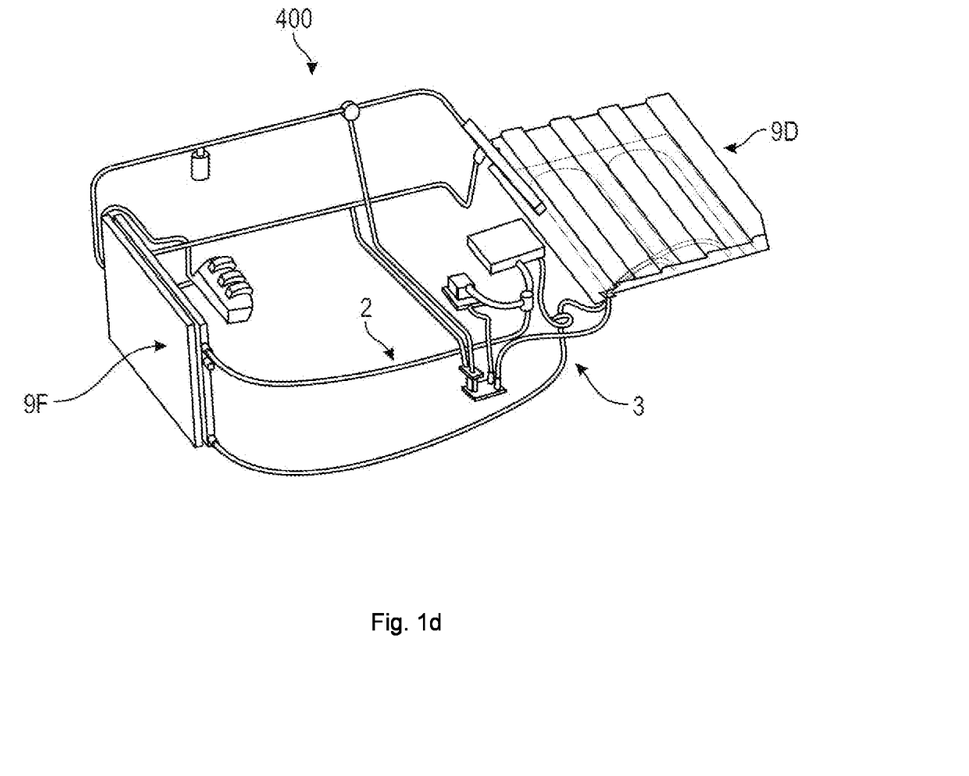
FIG. 1d shows a fourth example of a cooling loop according to the invention.

FIG. 1d shows a cooling loop 400 comprising a cooling radiator 9F and a battery cooler 9D, each of which can be equipped with a sensor 10. Here, the sensor 10 is preferably mounted at the inlet 2 or outlet 3 of the battery cooler 9D.

Figure 6A:
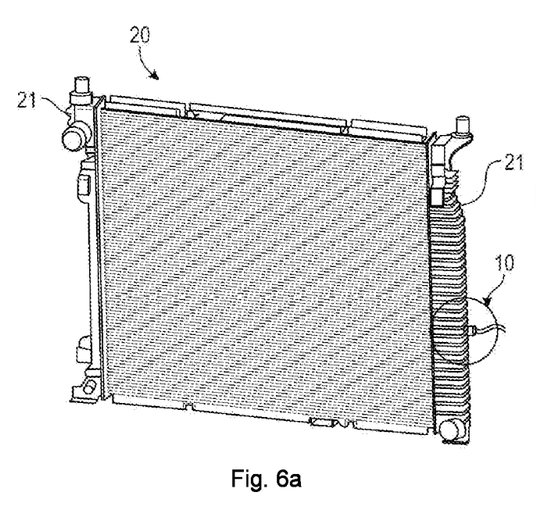
FIG. 6a shows an isometric view of a cooling radiator according to a first embodiment of the invention in a full view.
Figure 6B:
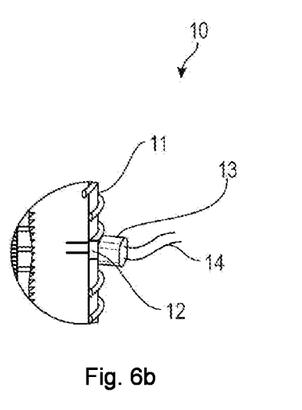
FIG. 6b shows an isometric view of a cooling radiator according to a first embodiment of the invention in a detail view.

FIGS. 6a and 6b illustrates a cooling radiator 20 of the cooling loop 200 described above. The radiator 20 comprises a heat exchange bundle and, on either side of said bundle, a header tank 21 for circulating the cooling liquid. Here, one of said header tanks 21 has a lateral opening configured to receive the sensor 10.

To do this, the sensor 10 comprises a threaded neck 12 which cooperates with a tapped hole in the lateral opening of said header tank 21, and a head 13 intended to close off said lateral opening. In particular, said neck 12 carries the probe 11 which is brought into contact with the cooling liquid by being connected to the microprocessor by means of a connection cable 14. Said cable passes through said head 13 of the sensor 10. Advantageously, the threaded neck 12 and the head 13 of the sensor 10 form a single body.

The sensor 10 thus formed can be easily associated with a header tank 21 of an existing cooling radiator, provided that said header tank has an opening with a geometry complementary to that of said sensor. Such a sensor thus performs the function of closing the header tank 21.

Figures 7A, 7B:
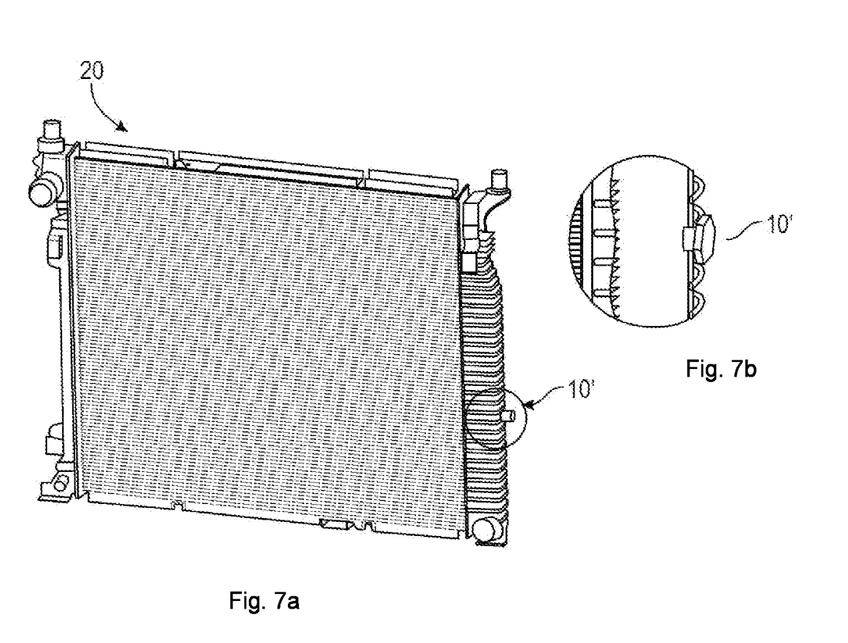
FIG. 7a shows an isometric view of the cooling radiator in FIG. 6a differently equipped in a full view.
FIG. 7b shows an isometric view of the cooling radiator in FIG. 6a differently equipped in a and detail view.

However, if the presence of the sensor in the header tank 21 of the cooling radiator 20 is not required, a cap 10' with no function other than closing can be used to close the lateral opening of said header tank 21. Such a cap 10' is shown in FIGS. 7a and 7b.

Figures 8A, 8B:
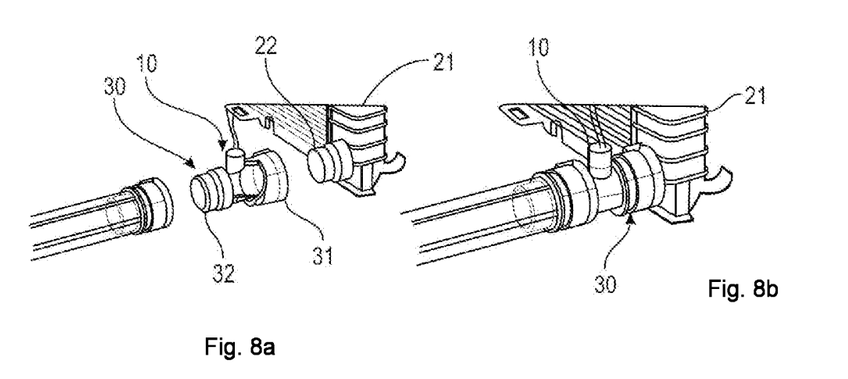
FIG. 8a shows a partial view of a cooling radiator according to a second embodiment of the invention in an exploded view.
FIG. 8b shows a partial view of a cooling radiator according to a second embodiment of the invention in an assembled view.

FIGS. 8a and 8b illustrates another embodiment of the cooling radiator 20. Here, the header tank 21 has a connection tube 22 designed to receive, for the purposes of a fluidic connection, a hose of the loop 200. A connection flange 30 is reversibly inserted between the connection tube 22 of the header tank 21 and the hose. According to the embodiment shown, said flange comprises a male part 31 which engages in the hose and a female part 32 which receives the connection tube 22.

The connection flange 30 carries the sensor 10 for measuring physical and/or chemical properties of the cooling liquid. In particular, the sensor 10 is mounted perpendicular to a longitudinal axis of the flange 30 through a transverse opening in said flange.

The sensor 10 thus mounted on the removable connection flange 30 can easily be associated with one of the header tanks 21 of an existing radiator 20 and thus incorporate a cooling loop.

Figure 9:
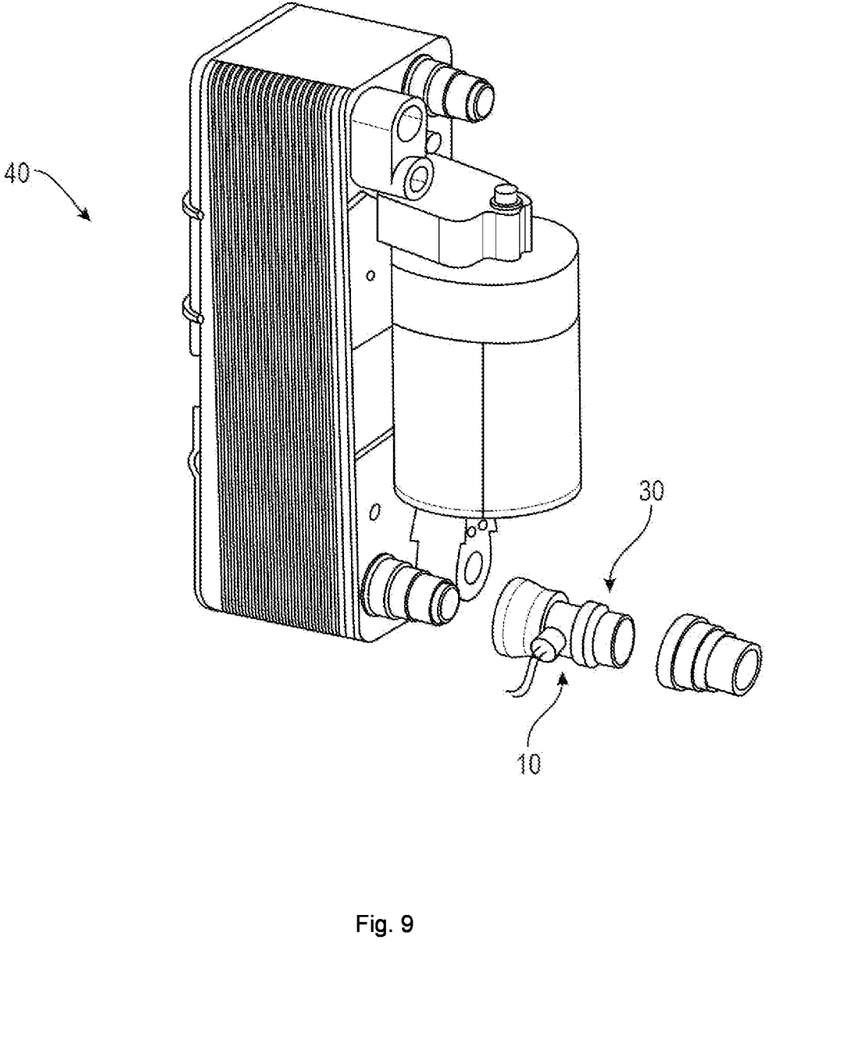
FIG. 9 shows an isometric view of a condenser according to the invention.
Figure 10:
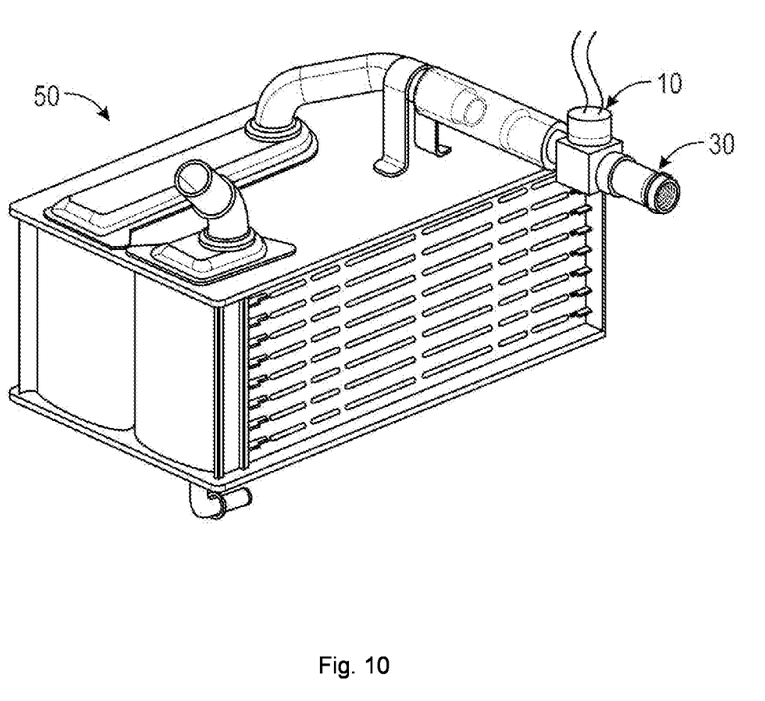
FIG. 10 shows an isometric view of a charge air cooler according to the invention.
Figure 11A:
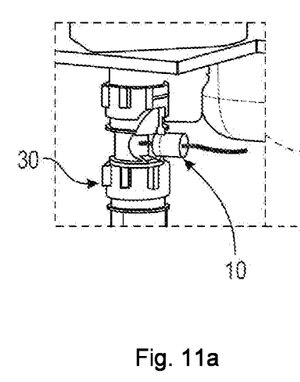
FIG. 11a shows an isometric view of a battery cooler according to the invention in a full view.
Figure 11B:
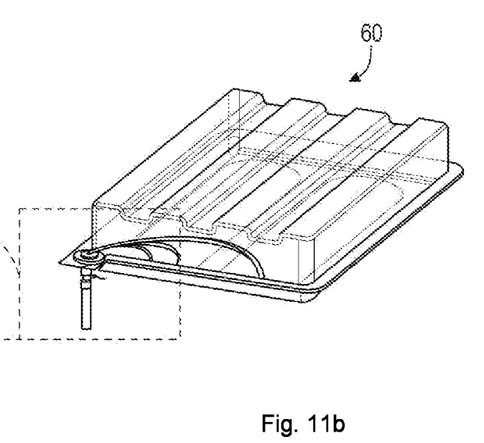
FIG. 11b shows an isometric view of a battery cooler according to the invention in a detail view.

The principle of a sensor mounted on a removable connection flange can be deployed on different types of heat exchangers, in particular on a water condenser 40 (FIG. 9) or a water charge air cooler 50 (FIG. 10) or a battery cooler 60 (FIGS. 11a and 11b). The assembly formed by said flange and said sensor can be mounted on a connection tube associated with an inlet and/or an outlet of a cooling circuit running through said exchangers.

What is claimed is:

1. A heat exchanger comprising a sensor for embedding in a cooling loop for a motor vehicle, the cooling loop being configured to allow a heat exchange between a cooling liquid and a liquid to be cooled, the sensor being configured to be positioned at least partially in contact with the cooling liquid and being configured to provide a measurement of a solute concentration of the cooling liquid, the measurement being obtained by taking account of the electrical conductivity and the viscosity of the cooling liquid, the sensor including a probe configured to be brought into contact at least partially with the cooling liquid, the cooling liquid being in flow or at rest, the heat exchanger further comprising a header tank for circulating the cooling liquid, and a removable flange configured to be connected to the header tank and to allow a connection of a tube for a passage of the cooling liquid between the tube and the header tank through the removable flange, the sensor being positioned on the removable flange.

2. The heat exchanger as claimed in claim 1, wherein the header tank includes an opening configured to selectively receive the sensor or a closure cap.

\* \* \* \* \*